(12) United States Patent
Schwedt et al.

(10) Patent No.: US 11,977,216 B2
(45) Date of Patent: May 7, 2024

(54) LIGHT MICROSCOPE AND METHOD OF CAPTURING IMAGES WITH A LIGHT MICROSCOPE

(71) Applicant: CARL ZEISS MICROSCOPY GMBH, Jena (DE)

(72) Inventors: Daniel Schwedt, Jena (DE); Tiemo Anhut, Jena (DE)

(73) Assignee: Carl Zeiss Microscopy GmbH, Jena (DE)

(*) Notice: Subject to any disclaimer, the term of this patent is extended or adjusted under 35 U.S.C. 154(b) by 0 days.

(21) Appl. No.: 17/766,098

(22) PCT Filed: Oct. 12, 2020

(86) PCT No.: PCT/EP2020/078601
§ 371 (c)(1),
(2) Date: Apr. 1, 2022

(87) PCT Pub. No.: WO2021/074073
PCT Pub. Date: Apr. 22, 2021

(65) Prior Publication Data
US 2022/0365332 A1    Nov. 17, 2022

(30) Foreign Application Priority Data
Oct. 15, 2019  (DE) .................. 10 2019 127 775

(51) Int. Cl.
*G02B 21/36* (2006.01)
*G01J 1/32* (2006.01)
*G01J 1/44* (2006.01)

(52) U.S. Cl.
CPC ............. *G02B 21/367* (2013.01); *G01J 1/32* (2013.01); *G01J 1/44* (2013.01); *G01J 2001/442* (2013.01)

(58) Field of Classification Search
CPC ..... G02B 21/367; G02B 21/0076; G01J 1/32; G01J 1/44; G01J 2001/442
See application file for complete search history.

(56) References Cited

U.S. PATENT DOCUMENTS 9,997,551 B2    6/2018  Mandai et al.
2011/0115897 A1   5/2011  Najmabadi et al.
(Continued)

FOREIGN PATENT DOCUMENTS

| DE | 102012023024 | * | 8/2014 |
| DE | 102014221542 A1 | | 4/2015 |
| WO | 2016135178 A1 | | 9/2016 |

OTHER PUBLICATIONS

Paolo, Annibale, et al.; "FCS, Autocorrelation, PCH, Cross-correlation"; 2015 Principles of Fluorescence Course Jan. 2, 2015; 1-85.
(Continued)

Primary Examiner — Tony Ko
(74) Attorney, Agent, or Firm — Duane Morris LLP

(57) ABSTRACT

A light microscope and a method for capturing images with a light microscope includes guiding illumination light to a sample; guiding detection light from the sample to a plurality of photon-counting sensor elements, which each successively capture a plurality of photon counts; forming a plurality of photon count distributions to be analyzed and at least one reference photon count distribution from the photon counts; calculating a similarity between each photon count distribution to be analyzed and the reference photon count distribution; and identifying sensor elements as overdriven as a function of the calculated similarity of the corresponding photon count distribution(s) to be analyzed.

20 Claims, 5 Drawing Sheets

(56) References Cited

U.S. PATENT DOCUMENTS

| | | |
|---|---|---|
| 2012/0176487 A1 | 7/2012 | Pinard et al. |
| 2014/0146376 A1 | 5/2014 | Kleppe et al. |
| 2018/0031420 A1* | 2/2018 | Dyba .................... G01J 3/2803 |
| 2019/0204148 A1 | 7/2019 | Mellot |
| 2019/0204577 A1 | 7/2019 | Faris et al. |

OTHER PUBLICATIONS

International Search Report dated Jan. 26, 2021 for PCT/EP2020/078601.

German Search Report dated Jul. 27, 2020 for DE 10 2019 127 775.2.

Dec. 7, 2023 The First Office Action issued by the State Intellectual Property Office of People's Republic of China for Chinese Patent Application No. 202080072679.9.

* cited by examiner

LIGHT MICROSCOPE AND METHOD OF CAPTURING IMAGES WITH A LIGHT MICROSCOPE

RELATED APPLICATIONS

The present application is a U.S. National Stage application of International PCT Application No. PCT/EP2020/078601 filed on Oct. 12, 2020, which claims priority benefit of German Application No. DE 10 2019 127 775.2 filed on Oct. 15, 2019, the contents of each are incorporated by reference in their entirety.

FIELD OF THE INVENTION

The present disclosure relates to a method of capturing images with a light microscope and to a light microscope.

BACKGROUND OF THE INVENTION

The use of fluorescent markers is increasing in particular with biological samples. A higher illumination intensity would facilitate the provision of a high speed in image data capture. As the sample can be damaged by the illumination, however, the illumination intensity should not be too high.

For these reasons, among others, particularly sensitive sensor elements are employed. Photomultipliers (PMTs) with a multi-alkaline cathode have frequently given way to PMTs with a GaAsP cathode, which has facilitated the achievement of an improved quantum efficiency in the visible spectral range. However, the multiplicative nature of the amplification process employed here introduces noise (so-called amplification noise or excess noise) into the measured signal. The net sensitivity is thus lower than the specified quantum efficiency.

In order to eliminate multiplication noise, the amplification can be increased to an extent that it is possible to count individual pulses triggered by single photons. For example, an electronic device capable of time-correlated single photon counting (TCSPC) is utilized to this end. The measured signal is purely digital and the measured intensity value can correspond to the number of photons impinging on the photocathode, reduced by the quantum efficiency. However, electronic devices have a dead time of, for example, a few tens of nanoseconds during which it is not possible to register incident photons.

As a result of the dead time, the signals can be distorted in cases where the illumination density of the sensor is too high. In particular, high illumination intensities on the sensor elements can result in a measurement value that is too low (so-called pile-up effect). Thus, although measurements that use photon counting can be very sensitive, it takes a relatively long time to attain a certain signal-to-noise ratio (SNR) in the image data. This problem can be alleviated by means of parallelized photon counting, wherein the detection PSF (point spread function) of the signal is distributed over an array, i.e. an arrangement, of a plurality of photon-counting sensor elements. Photons thereby statistically impinge on a large number of sensor elements in a distributed manner. This increases the probability that most sensor elements are active when a photon hits and only a few sensor elements are in their dead time after the registration of a previous photon.

A generic method for capturing images with a light microscope comprises at least the following steps: guiding illumination light to a sample; and guiding detection light from the sample to a plurality of photon-counting sensor elements, which each successively capture a plurality of photon counts.

A generic light microscope accordingly comprises a light source for emitting illumination light to a sample as well as a plurality of photon-counting sensor elements for capturing detection light from the sample. The photon-counting sensor elements are respectively configured to successively capture a plurality of photon counts.

An overdrive of sensor elements remains problematic in this connection even when a sensitivity can in principle be set individually for the different sensor elements, as described, for example, in U.S. Pat. No. 9,997,551 B2. A disadvantageous saturation with a distortion of image information also occurs with arrays of sensor elements in particular when a user increases the illumination power in order to achieve an optimum image quality. At a low illumination intensity, although increasing the exposure time per sample point can enhance the image quality, it also leads to a longer measurement time and is undesirable for the observation of processes over time.

SUMMARY OF THE INVENTION

It can be considered an object of the invention to provide a light microscope and a method for capturing images with a light microscope by means of photon-counting sensor elements, wherein errors in image capture are detected and, if appropriate, compensated.

This object is achieved by means of the method with the features of the method claims and by means of the light microscope with the features of the microscope claims.

Advantageous variants of the light microscope according to the invention and of the method according to the invention are the object of the dependent claims and are also illustrated in the following description.

In the method of the aforementioned type, according to the invention, at least the following steps are carried out:

forming a plurality of photon count distributions to be analyzed as well as at least one reference photon count distribution from the photon counts;

calculating a similarity between each photon count distribution to be analyzed and the reference photon count distribution; and identifying sensor elements as overdriven as a function of the calculated similarity of the corresponding photon count distribution(s) to be analyzed.

The light microscope of the aforementioned type, according to the invention, comprises a control unit which is configured to:

form a plurality of photon count distributions to be analyzed as well as at least one reference photon count distribution from the photon counts;

calculate a similarity between each photon count distribution to be analyzed and the reference photon count distribution; and identify sensor elements as overdriven as a function of the calculated similarity of the corresponding photon count distribution(s) to be analyzed.

Different embodiments of the invention exploit the fact that a plurality of sensor elements measure a very similar image content but receive light intensities of different magnitudes. A readily comprehensible example is the so-called Airyscan (also known as image scanning microscopy), wherein a sample point is illuminated and this sample point is imaged onto an array of a plurality of sensor elements. The detection PSF extends over a plurality of the sensor elements so that their measurement values essentially derive from the same sample point. The detection PSF does not have a constant value across the sensor elements, however, but can rather exhibit, for example, the form of a Gaussian curve in a lateral direction across the sensor elements. Central sensor elements thus receive more light than outer sensor elements and measure higher photon counts than outer sensor elements. The sample can now be scanned with a beam of illumination light while the sensor elements measure a photon count for each illuminated sample point. The photon counts of a sensor element can be aggregated into a photon count distribution so that a photon count distribution is formed, for example, for each sensor element. The photon count distributions are derived essentially from the same image content, but differ in terms of the magnitude/number of the photon counts, mainly due to the form of the detection PSF. In particular after a rescaling which compensates/standardizes the various magnitudes of the photon counts of the photon count distributions, the photon count distributions should therefore essentially correspond to one another. If a sensor element was overdriven (saturated) during the measurement process, then its highest photon counts are too low. It is thus possible to detect in a comparison of the photon count distributions whether sensor elements were overdriven during the capture of photon counts and, as a result, correspond to distorted image information. If a sensor element is identified as overdriven, suitable measures can optionally be implemented in an automated manner, for example a mathematical correction of overdriven photon counts or a new image capture with appropriately modified microscope settings, as described in greater detail later on.

Forming of Photon Count Distributions

For a comparison of photon count distributions, at least one photon count distribution is used as a reference photon count distribution. For the reference photon count distribution, it is known or assumed that a saturation did not occur during the capture of the photon counts, as explained in greater detail later on. The remaining photon count distributions are referred to as photon count distributions to be analyzed.

A photon count distribution can be formed from photon counts of exactly one or from the photon counts of a plurality of sensor elements. The number of photon count distributions, i.e. of photon count distributions to be analyzed and of the reference photon count distribution(s), can thus be smaller, equal to or in principle also greater than the number of sensor elements. In particular, groups of sensor elements can be formed ("binning"), wherein the photon counts of the sensor elements of a group are aggregated and together form a photon count distribution. The at least one reference photon count distribution can also be formed in this manner; alternatively, a reference photon count distribution can be calculated by aggregating a plurality of photon count distributions.

Determination of a Reference Photon Count Distribution

The reference photon count distribution should be formed from the photon counts of one or more sensor elements that were not saturated/overdriven during the conducted measurement. This selection can occur in a number of ways.

For example, at least one photon count distribution can be selected for use as a reference photon count distribution, wherein the selection occurs as a function of the magnitude of the photon counts of the corresponding photon count distribution. By taking into account the magnitude of the photon counts, it can be ensured that the reference photon count distribution is formed from photon counts of one or more sensor elements that were not overdriven. Instead of using selected photon count distributions as the reference photon count distribution(s), it is also possible to calculate a single reference photon count distribution from the selected photon count distributions by means of an aggregation (for example, by summing, averaging, or standardizing and subsequently summing or averaging).

A prerequisite for the use of the photon counts of a sensor element for the reference photon count distribution can be that the highest of the photon counts measured by that sensor element is lower than a predetermined upper limit. The prerequisite can also be varied such that a mean value formed from the highest photon counts of this photon count distribution (for example, the mean value of the highest percentages of photon counts) must be lower than the predetermined upper limit. The upper limit can be established as a function of a maximum count rate of a sensor element and can in particular be between 1% and 30% of the maximum count rate multiplied by an exposure time. Exposure time in this context indicates the measurement time for capturing a photon count. It is ensured by means of such an upper limit that the photon counts of the reference photon count distribution were not captured at a saturation. The maximum count rate can indicate the maximum count rate that can be attained when a sensor element is in saturation. Alternatively, the maximum count rate can also be indicated as the inverse of the dead time of the sensor element, for example roughly as 0.1/dead time. The dead time of a sensor element is frequently known and lies at values between 10 and 100 ns. For a sensor element with dead times of 50 ns, the upper limit for the count rate can consequently be established as 2 MHz.

It is also possible to determine a signal magnitude measure from photon counts of a sensor element; for example, a mean value of the photon counts or the highest of the photon counts can be used as a signal magnitude measure. A prerequisite for the use of the photon counts of a sensor element for the reference photon count distribution can now consist in that the corresponding signal magnitude measure exceeds a predetermined minimum value and/or falls below the aforementioned upper limit. By exceeding a minimum value, it is ensured that signal values of a sufficient magnitude are used for the reference photon count distribution.

It is alternatively possible to select one of the plurality of photon count distributions as a reference photon count distribution by calculating a correlation between the photon count distributions. It is in particular possible to select a photon count distribution that exhibits a predetermined high correlation with a certain number of other photon count distributions as a reference photon count distribution, wherein the number in question is ideally as large as possible. This is based on the idea that often only a few sensor elements in the centre of the light spot are oversaturated while most of the sensor elements operate in their linear range. If a photon count distribution exhibits a high correlation with a large number of other photon count distributions, the corresponding sensor element(s) probably operated in their linear (non-saturated) range. Moreover, the shape of a photon count distribution changes depending on the degree of saturation so that, even in cases where a large number of sensor elements are overdriven, their photon count distributions do not always exhibit a high correlation with one another. Optionally, a further potential prerequisite for use as a reference photon count distribution provides that a signal magnitude measure of the photon count distribution is of an adequate magnitude. For example, it is possible to select for a reference photon count distribution, from the photon count distributions with a high correlation with one another, the photon count distribution(s) whose signal magnitude measure, defined in greater detail in the foregoing, is greatest or which at least does not lie in the lower half of the values of the signal magnitude measure. This prevents the selection of a photon count distribution as a reference photon count distribution whose photon counts have a disadvantageously low SNR.

The selection of at least one photon count distribution for use as a reference photon count distribution can additionally or alternatively also occur as a function of a position of the corresponding sensor element or elements. For example, a photon count distribution can be formed from photon counts of one or more sensor elements arranged in an outer area and used as a reference photon count distribution. For example, the outermost 30% of all sensor elements can be considered the outer area. Depending on the measurement method, it is possible to employ a binning, wherein photon count distributions are respectively formed, for example, from the photon counts of sensor elements arranged in a ring shape. The photon count distribution of an outer (or the outermost) ring shape of sensor elements can then be used as a reference photon count distribution. The selection of at least one photon count distribution for use as a reference photon count distribution can also occur as a function of a position of the corresponding sensor element or elements relative to the focus of an incident light intensity distribution. It is in particular possible to select one or more sensor elements whose position is at a distance from the focus of the light intensity distribution in order to minimize the risk of an oversaturation of the selected sensor elements.

Rescaling and Similarity Determination

Optionally, a rescaling between each photon count distribution to be analyzed and the reference photon count distribution can be calculated. The similarity between each photon count distribution to be analyzed and the reference photon count distribution is then calculated while taking the relevant rescaling into account.

The purpose of calculating a rescaling is to facilitate a better comparison of photon count distributions of different signal magnitudes with one another. Rescaling can be understood as a modification of the range of photon counts occurring in a photon count distribution and/or of the magnitude of the photon counts. Rescaling can also be referred to as a resizing or scaling of the photon counts of a distribution. When the image content is similar, the photon count distributions should be similar except for their scaling, i.e. the shape of their curve should be similar. If this is not the case, the reason can lie in a saturation of a sensor element. For the purposes of rescaling, either the photon count distribution to be analyzed and/or the reference photon count distribution can be rescaled. A size measure of the photon count distribution to be analyzed and reference photon count distribution can be determined and, as a function of the size measures, one of the photon count distributions can then be stretched or compressed so that the size measures subsequently correspond to one another.

The rescaling can also be considered a (linear) mapping of the photon count distribution to be analyzed to the reference photon count distribution (or vice versa). For the purposes of rescaling, it is consequently possible to determine one or more parameters of a mapping function, which is applied to the photon count distribution to be analyzed or to the reference photon count distribution.

Rescaling can comprise, for example, adapting a fit function to the reference photon count distribution and adapting the fit function to each photon count distribution to be analyzed. One or more fit parameters are thus determined for each photon count distribution, which describe the curve of the photon count distribution in question. A stretching or compression of one of the photon count distributions to be analyzed or of the reference photon count distribution can now occur, wherein the stretching/compression depends on the determined fit parameters. The stretching/compression can be carried out in particular such that an adaptation of the fit function to the stretched/compressed photon count distribution would yield a fit parameter equal to the fit parameter of the photon count distribution to be compared therewith.

The fit function can describe, for example, an exponential decay; in particular, a fit function $f(x)$ can be defined as $f(x)=f0*\exp(-x/c)$ or comprise at least the expression $f0*\exp(-x/c)$ linked multiplicatively, additively or in some other manner to further expressions, where: x: photon counts of a photon count distribution; $f$: frequency of a photon count; exp: exponential function; $f0$ and c: fit parameters. It is also possible to use other fit functions, wherein it can be advantageous if the fit function contains only two fit parameters or at most three fit parameters.

It can be provided that the fit function is only adapted to an upper photon count segment of the photon count distribution, for example only to the half containing the larger photon counts, while the half containing the smaller photon counts is ignored. This has the advantage that, following the adaptation and subsequent rescaling, the frequencies of the highest photon counts of the reference photon count distribution and of a photon count distribution to be analyzed can be compared particularly well with one another. Differences in the frequency of the highest photon counts x are a particularly clear indication of a saturation for the photon count distribution to be analyzed.

In the case of the above example of a fit function in the form of an exponential function, the determined values for $f0$ and c generally differ between the reference photon count distribution and the photon count distribution to be analyzed. A factor is determined from the difference between the two determined values for c (and optionally also for $f0$), with which the grey value axis (photon count axis) is stretched or compressed. The stretching or compression occurs such that a subsequent fitting would yield equal values of c and $f0$ for the two photon count distributions to be compared.

The calculation of the similarity can comprise at least a calculation of a correlation coefficient R (or a variable dependent thereon) between one of the photon count distributions to be analyzed Hn and the reference photon count distribution Hr, in particular after the rescaling between them has been carried out, for example by:

$$R=covar(Hn,Hr,)/(stdev(Hn)*stdev(Hr))$$

where covar(Hn, Hr) is the covariance between Hn and Hr; and stdev(Hn) and stdev(Hr) are the standard deviations of Hn and Hr, respectively.

In cases where the calculated correlation coefficient R falls below an established minimum value, the corresponding photon count distribution to be analyzed is identified as overdriven, i.e. the sensor element or sensor elements from whose photon counts the photon count distribution to be analyzed was formed are identified as overdriven. For example, it can be provided that a similarity of two photon count distributions is affirmed if the corresponding correlation coefficient R or its absolute value is greater than a limit value which lies in particular between 0.80 and 0.98, in particular between 0.92 and 0.97.

The rescaling and the similarity determination can also be carried out in a conjoined computation.

In further embodiments, a deviation measure of the frequency values of the largest photon counts relative to a fit function adapted to the photon count distribution in question is first determined. The rescaling can then be applied so that the deviation measure of the photon count distribution to be analyzed and the deviation measure of the reference photon count distribution can be compared with one another in order to carry out the similarity determination. In particular with such calculations, the computations for rescaling and for determining similarity can be switched or occur in a different order.

Depending on the type of similarity determination, a separate rescaling does not have to occur. This is in particular the case with the following example of a similarity determination via calculation of a modified cross-correlation between a reference photon count distribution and a photon count distribution to be analyzed. A cross-correlation coefficient corr{k} can be calculated here by:

$$corr\{k\} := \text{sum } [Hn(x) \cdot Hr(x, k)]/[\text{sum } Hn(x)^2 \cdot \text{sum } Hr(x, k)^2]^{1/2}$$

where the sums run across the photon counts x and the photon count distributions $Hn(x)$ and $Hr(x)$ indicate the frequencies of the different photon counts x. In standard methods for calculating a cross-correlation, k represents a shift, in the form $Hr(x+k)$. In the present disclosure, in contrast, the parameter k can describe a compression or stretching of the photon counts x. In particular, the photon counts x of at least one of the photon count distributions $Hn(x)$ and $Hr(x)$ can be stretched/compressed as a function of the parameter k, wherein optionally an additional stretching/compression of the frequencies of the photon counts x can also occur. A stretching/compression can be described by various mathematical expressions; for example, k can be a factor (by which the photon counts x are multiplied), wherein $k=k(x)$ can also be x-dependent. More complex expressions involving a shift and multiplication of the x-values can also be used to describe a compression/stretching in the calculation of a cross-correlation coefficient corr{k}.

Image Capture Modes

The measures according to the invention for identifying overdriven sensor elements are suitable for different image capture modes, in particular for different sample-scanning methods and widefield imaging.

In some embodiments, the sample is scanned with the illumination light while the photon-counting sensor elements successively capture the photon counts. At least one illumination point (illumination spot) is generated on the sample and the illumination spot successively scans the sample areas to be analyzed. In image scanning microscopy, often referred to as Airyscanning, a distance between adjacent sensor elements (measured from the centre of one sensor element to the centre of an adjacent sensor element) is less than 1 airy (1 AU, airy unit). 1 airy is the size of a diffraction disk in the image plane onto which a point of the sample plane is imaged. The sensor elements are arranged in the image plane here. The size of an airy is determined by the detection PSF, which can, for example, have the shape of a Gaussian function or the functional shape of a well-known diffraction disk. An illuminated sample point is thus imaged onto a plurality of the photon-counting sensor elements according to the detection PSF, wherein central sensor elements receive more light than outer sensor elements. A reference photon count distribution without overdrive can thus be formed, for example, from photon counts of one or more outer sensor elements. Saturated sensor elements in the image centre can then be detected by comparing the photon count distributions.

A similar image capture mode is confocal (laser) scanning microscopy. In this case, the simultaneously measured photon counts of a plurality or of all of the sensor elements are aggregated in order to generate a sample point signal that is derived from the currently illuminated sample point.

Alternatively, a widefield illumination can be provided by guiding the illumination light onto the sample. As in the case of the Airyscan described above, the sensor elements can be so close together that a sample point is imaged onto a plurality of sensor elements. In particular, sensor elements can be so close to each other that their resulting resolution is at least as high, in particular at least twice as high, as a resolution corresponding to the Nyquist criterion. A comparison of photon count distributions is thereby also possible with widefield illumination since adjacent sensor elements measure very similar image content and differences are primarily due to oversaturation. In this connection, it can be provided that, instead of using a single reference photon count distribution, a separate reference photon count distribution is respectively employed for a group of a plurality of adjacent sensor elements which are supposed to receive similar image information.

If a widefield illumination is provided by guiding the illumination light onto the sample, then a time series measurement can also be conducted in addition or alternatively to the features described above. In the time series measurement, different illumination settings and/or detection settings can be implemented successively or the same illumination settings and detection settings can be implemented constantly, while the same sample area is being illuminated, and photon counts successively captured for one or more photon count distributions. A photon count distribution can be respectively formed from photon counts of adjacent sensor elements and/or from the photon counts captured successively by the same sensor element. The illumination settings and/or detection settings can differ, for example, in the illumination light intensity or power that reaches the sample, in filter settings that affect the power of the incident light on the sensor elements, and/or in a sensitivity setting of the sensor elements (thus modifying the probability that an incident photon will be registered). A sensor element in the time series measurement thereby captures photon counts of different magnitudes, which derive from the same sample point but which are different due to the different illumination settings and/or detection settings.

Follow-Up Actions in the Event of an Identification of Overdriven Sensor Elements If one or more sensor elements are identified as overdriven, it is possible for a corresponding output to be issued to a user, for example indicating that an illumination light power is too high. Additionally or alternatively, further actions can also be carried out in an automated manner.

When it is described in the following that an action is carried out when sensor elements are identified as overdriven, this is intended to comprise variants in which the actions are only carried out when a predetermined minimum number of sensor elements or corresponding photon count distributions have been identified as overdriven.

In particular, a result image can be calculated from the captured photon counts of the sensor elements, i.e. from at least a part of the captured photon counts. Photon counts of sensor elements identified as overdriven can either not be included here or first be mathematically corrected before they are included in the calculation of the result image. In order to avoid a distortion of image grey values, it can be provided that all photon counts captured by a sensor element identified as overdriven are rejected and are not included in the calculation of the result image. The case of a mathematical correction can relate either to all photon counts of a sensor element that has been identified as overdriven or only to a portion of these photon counts above a limit value (as lower photon counts of a sensor element that has been identified as overdriven are probably not affected by the saturation). For a mathematical correction, it is possible, for example, for the photon counts of an overdriven sensor element to be replaced by extrapolated photon counts of adjacent (not overdriven) sensor elements. The extrapolation can occur while taking the detection PSF into account and in particular as a function of an average photon count of the respective photon count distributions. In cases where a photon count is derived from the photon counts of adjacent sensor elements, it is also possible to speak of an interpolation instead of an extrapolation.

Alternatively, in cases where sensor elements are identified as overdriven, a sample analysis (/image capture) can also be repeated with modified microscope settings. In this connection, it can be provided that, depending on the number of sensor elements that have been identified as overdriven, either a mathematical correction is carried out or the sample analysis is repeated with modified microscope settings without a mathematical correction. In this case, a microscope setting is modified such that an incident light power per sensor element is reduced. For example, the light intensity of an illumination light source can be reduced and/or a zoom optic in the detection light path can be adjusted so that a cross-section of a beam of detection light is magnified when it strikes the sensor elements.

A control unit can calculate, based on the modified microscope setting and optionally based on a predetermined target image quality, by how much an exposure time is to be extended during the repeated sample analysis. In a scan, the exposure time can be the pixel dwell time during which essentially the same sample point is illuminated. An adequate image quality is thereby achieved despite a reduced light power impinging on the sensor elements.

If sensor elements are still identified as overdriven in the repeated sample analysis, the aforementioned processes of reducing the power of the incident light and optionally increasing the exposure time can be repeated until no sensor elements or no more than a predetermined maximum number of sensor elements are identified as overdriven.

The aforementioned scanning methods can also be implemented with a multi-spot illumination. In this case, the illumination light is scanned over the sample in the form of a plurality of illumination points. The illumination points can optionally successively scan the same areas of the sample. Detection light deriving from different illumination points is detected separately, for example by a plurality of the described arrays of sensor elements. These arrays can also be adjacent parts of a single larger array of sensor elements. The aforementioned photon count distributions derive from a first illumination point. If an overdrive is established as described (i.e. for the first illumination point), it can be provided that a microscope setting is modified for the remainder of the illumination points such that an incident light power per sensor element belonging to the illumination point in question is reduced. It is thereby possible to prevent overdrives for the further illumination point(s). Preferably, the identification of an overdrive occurs while the scanning of the sample with the first illumination point is still in progress.

In some embodiments, in cases where no sensor elements or no more than a predetermined maximum number of sensor elements have been identified as overdriven, a check is conducted to determine whether an image quality calculated from the photon counts attains a predetermined target image quality. The image quality can be calculated either directly from the photon counts or from a result image formed from the photon counts. For example, a signal-to-noise ratio (SNR) can be calculated as an image quality and the predetermined target image quality is a target SNR. If the predetermined target image quality is not achieved, a new image is captured with modified microscope settings. The modified microscope settings cause a higher detection light intensity per sensor element or a longer exposure time, in particular a longer pixel dwell time in cases where the sample is scanned. For example, it is possible to increase the power of an illumination light source, adjust filters in the light path accordingly or modify the size of the detection PSF by means of a zoom optic. The pixel dwell time can be increased by moving the illumination light more slowly over the sample. With the same effect, the same sample areas can also be scanned with illumination light a number of times in succession. For the photon counts measured in the new image capture, it is once again determined via the photon count distributions whether sensor elements were overdriven and whether the target image quality was attained. If the target image quality has still not been achieved, the microscope settings are again modified as described above.

Besides a desired target image quality, it is intended to achieve a measurement that is as rapid as possible. To this end, it can be provided that the new image capture first occurs with an increased illumination light intensity and not with an increased pixel dwell time. Only in cases where sensor elements are identified as overdriven during this new image capture does there occur a further image capture in which the illumination light intensity is lowered again and the pixel dwell time is extended instead. If the target image quality is not achieved, there occurs a further new image capture for which the pixel dwell time is further increased and the illumination light intensity is no longer further increased.

Photon-counting sensor elements can be formed, for example, by PMTs (photomultiplier tubes) or a multi-anode PMT. Alternatively, the photon-counting sensor elements can be SPAD (single photon avalanche diode) elements. A fibre bundle can also be provided onto which the sample plane is imaged and which relays detection light to the photon-counting sensor elements. A SPAD element can comprise a semiconductor compound with a depletion region without free charge carriers. A voltage above the breakdown voltage is applied to the compound. If a photon is absorbed, it can generate a free charge in the depletion region and, as a result, a charge avalanche can be triggered, which spreads across the diode and is captured as one photon count. A photon-counting sensor element thus outputs a discrete photon count corresponding to the registered number of photons. A plurality of sensor elements can be formed together in the form of a SPAD array, which can be manufactured, e.g., using CMOS technology or in CMOS-compatible processes as a photon-counting array. The sensor elements cited in this disclosure can be formed by one or more such arrays.

As long as there is no saturation of a sensor element, the number of photons registered (photon count) is proportional to the number of incident photons. The photon transfer curve thus has a linear progression. However, in cases of large numbers of incident photons, some photons reach the sensor element while it is in its dead time after the registration of a previous photon. An incident photon is thus not registered so that the photon transfer curve flattens with an increasing number of incident photons. A saturation can thus be defined as a deviation of the registered number of photons from a linear photon transfer curve by a minimum value; in the case of a minimum value of 10%, a photon count or count rate that deviates by 10% or more from the count predicted by a linear photon transfer curve based on the current incident photon rate is thus designated a state of saturation.

With active quenching, i.e. an active restoration of the operating voltage on the SPAD element, the photon transfer curve flattens asymptotically. With passive quenching, on the other hand, the incident photons during the dead time cause an increase in the time required to restore the operating voltage. As a consequence of the increased dead time, the number of photons registered actually decreases in cases of saturation with an increasing number of incident photons.

The cited sensor elements can be pixels of a common sensor. This sensor can also comprise further sensor elements, whose measurement values do not necessarily have to be processed as described for the remaining sensor elements. The cited sensor elements can also belong to a plurality of sensors. In particular in the case of multi-spot illuminations, it is, for example, possible to provide a plurality of sensors, which respectively comprise sensor elements whose measurement values are assessed in the described manner.

In principle, the control unit can be any computing device, which can be distributed locally or alternatively be formed by a unit or module. For example, the control unit can be formed by a computer, a processor, an FPGA (field-programmable gate array) or some other programmable module, or can comprise one or more of the cited components. One or more FPGAs or other programmable modules can in particular be connected to the sensor or built directly into the sensor comprising the sensor elements.

Embodiments of the light microscope of the invention can be configured to execute the described method variants. The computational and control operations, for example the steps relating to the photon count distributions and the resulting control of microscope settings, can be carried out by means of the control unit of the light microscope. In particular, the control unit can comprise an FPGA or some other programmable module on which the described method or steps of this method are implemented. It is thereby possible for a fully automated process to occur or, alternatively, for at least the method steps relating to the control of the sensor elements and the processing of photon counts to be executed in an automated manner, in particular the features of the characterizing part of the independent method claim. Conversely, the intended use of the described embodiments of the light microscope according to the invention also yield variants of the method according to the invention. Numerical values and formulations with "essentially" or "approximately" used in numerical contexts can be understood as comprising the exact relation or numerical value and/or deviations of up to 10%.

BRIEF DESCRIPTION OF THE DRAWINGS

Further advantages and features of the invention are described in the following with reference to the attached schematic figures.

DETAILED DESCRIPTION OF THE DRAWINGS

As a rule, identical components and components that function in an identical manner are designated in the figures by the same reference signs.

Figure 1:
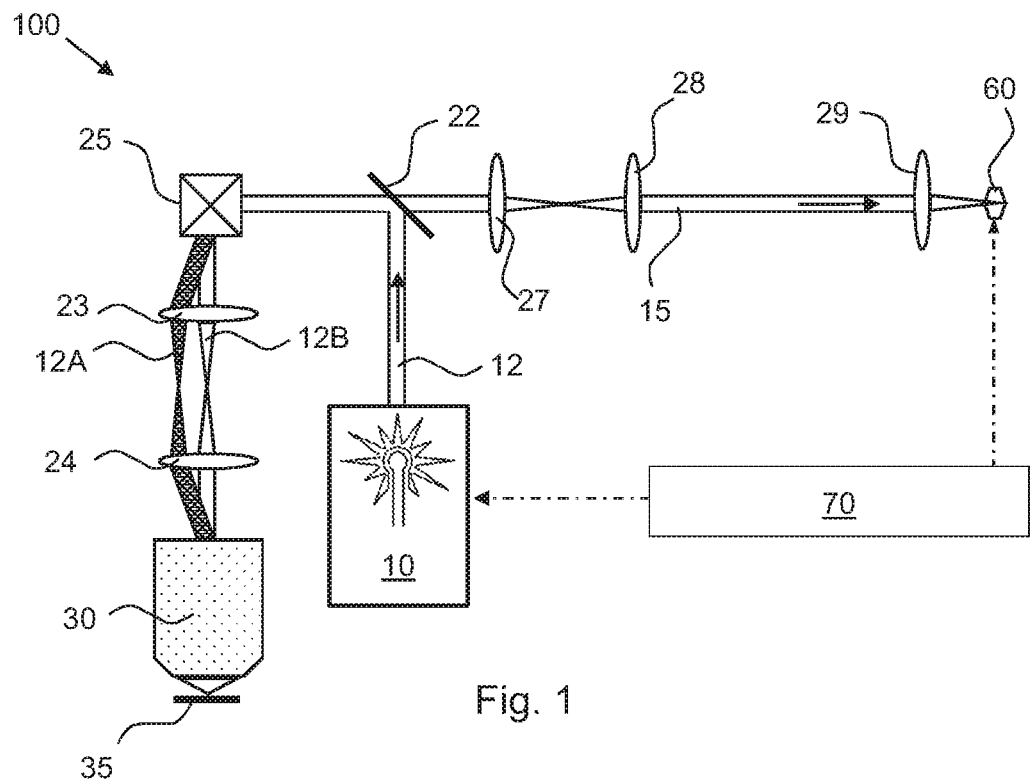
FIG. 1 is a schematic illustration of an example embodiment of a light microscope of the present disclosure.

FIG. 1 shows an example embodiment of a light microscope 100. The light microscope 100 comprises a light source 10, for example one or more lasers, which emits illumination light 12, which is guided via a scanner 25, optional optic elements 23, 24 and an objective 30 onto a sample plane on which a sample 35 to be analyzed can be arranged. By means of the scanning movement of the scanner 25, the illumination light 12 is successively guided along different light paths 12A, 12B in order to scan the sample 35. Detection light 15, for example fluorescent light, emanates from the sample 35 and is guided via the objective 30, the optic elements 24, 23 and the scanner 25. The light microscope 100 further comprises a beam splitter 22 which, for example, reflects illumination light 12 and transmits detection light 15, or vice versa, depending on the wavelength. After the beam splitter 22, the detection light 15 reaches a sensor 60 via further optional optic elements 27, 28, 29. A schematically illustrated control unit 70 controls the light source 10, the scanner 25 and the sensor 60.

Figure 2:
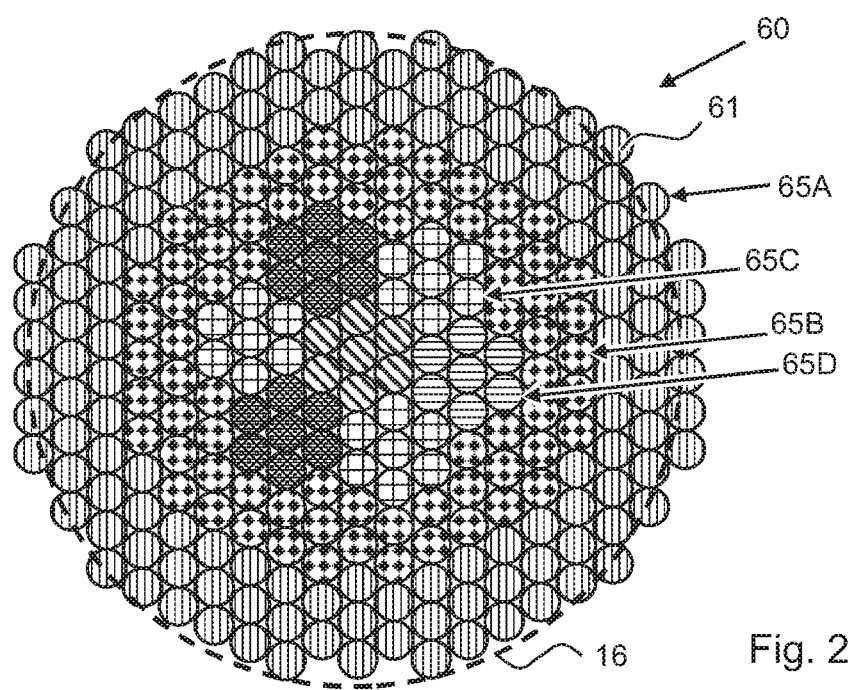
FIG. 2 is a schematic illustration of the sensor of FIG. 1.

FIG. 2 shows an enlargement of the sensor 60, which comprises a plurality of photon-counting sensor elements 61, here by way of example SPAD elements. Detection light emanating from a sample point illuminated according to the current scanner position is imaged into the detection plane/image plane as a detection light spot 16 according to the detection PSF. In the example of FIG. 2, the detection light spot 16 extends over all sensor elements 61. In principle, each sensor element 61 can successively capture a plurality of photon counts deriving from the different illuminated sample points during the scanning process. Alternatively, a plurality of sensor elements 61 can be combined into groups 65A, 65B, 65C, 65D ("binning"), wherein photon counts of sensor elements of the same group are aggregated.

Since the detection PSF or detection light spot 16 extends over a plurality of sensor elements 61, the sensor elements measure very similar pieces of image information, which are only slightly shifted relative to one another. The photon counts of the sensor elements 61, however, are very different due to the form of the detection PSF. For example, the detection PSF can have a shape of a Gaussian curve in which central sensor elements 61 (for example, sensor elements of the groups 65C and 65D) receive more detection light than outer sensor elements 61 (for example, of the group 65A).

If a photon-counting sensor element 61 registers an incident photon, a short dead time ensues during which this sensor element 61 is unable to measure a further incident photon. In the event of a high detection light intensity, there is thus a risk of a saturation/overdrive of sensor elements 61. The photon counts measured are then no longer proportional to the number of incident photons. If an image of the sample (=result image)/sample image is calculated from the photon counts, a saturation of individual sensor elements thus leads to erroneous image information.

Such saturation is detected by means of the invention. For this purpose, it is exploited that a plurality of sensor elements 61 measure essentially the same image content, yet are hit by different levels of detection light intensity essentially as a result of the form of the detection PSF. Should a comparison of the count rates of a plurality of sensor elements 61 yield considerable differences, this can indicate a saturation. A procedure according to the invention for identifying saturated sensor elements is described with reference to FIGS. 3 to 8.

Figure 3:
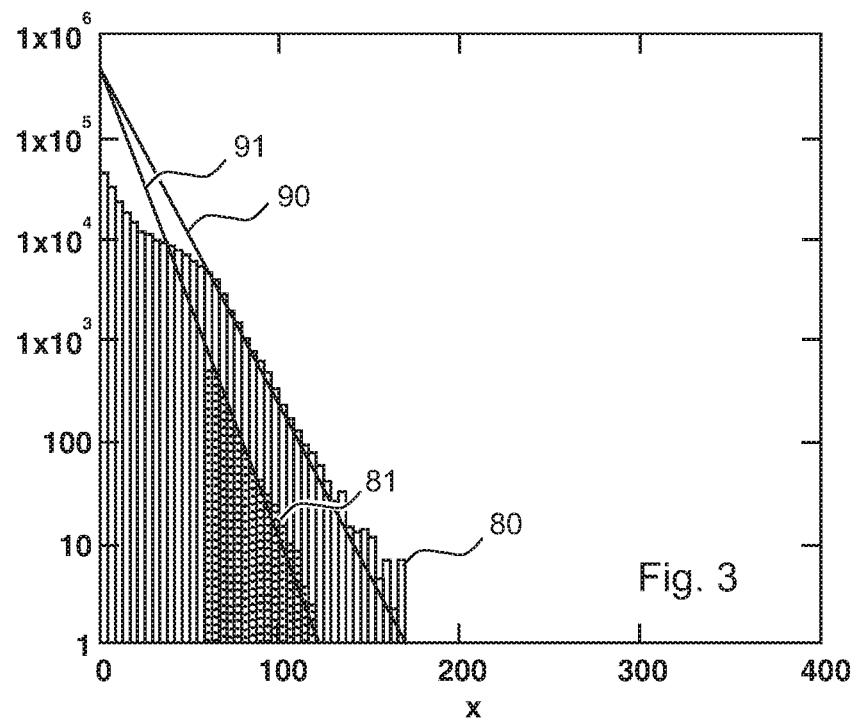
FIGS. 3, 5, 7 show histograms of photon count distributions of the sensor elements of the light microscope of FIG. 1.

FIG. 3 shows a histogram of a photon count distribution 81 indicating the frequency of grey values or photon counts x of a sensor element 61 or a group 65A of sensor elements. For a better overview, only the half containing larger photon counts of the photon count distribution 81 is shown. The photon counts can have been captured for different sample points during a sample scan. The abscissa gives the photon count x and the ordinate indicates the frequency with which the respective photon counts were measured.

FIG. 3 also shows a further histogram (reference histogram) of a reference photon count distribution 80 indicating the frequency of the photon counts captured by a different sensor element 61 or another group 65B of sensor elements during the sample scan. A photon count distribution is used as the reference photon count distribution 80 for which it is certain that a saturation did not occur during the measurements or at a minimum occurred only very rarely, as explained in greater detail elsewhere.

Figure 4:
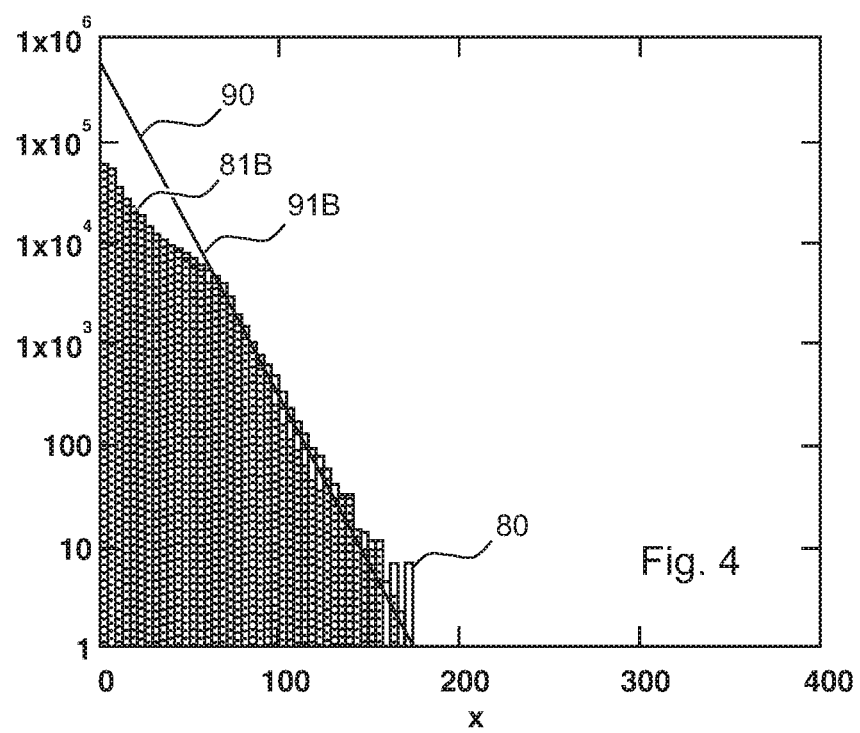
FIGS. 4, 6, 8 show histograms calculated from the photon count distributions of the histograms of FIGS. 3, 5 and 7.
Figure 5:
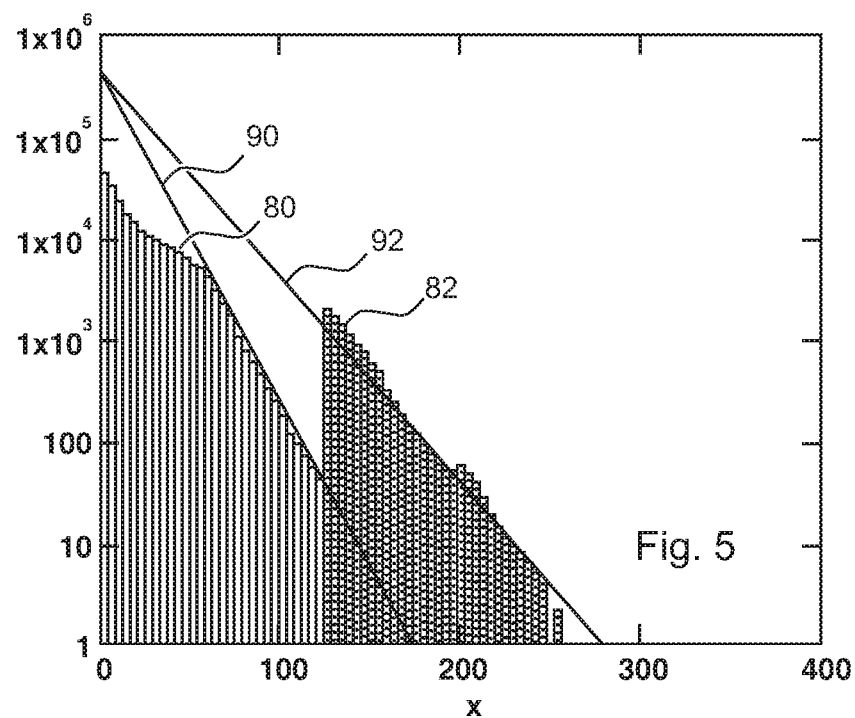

In order to facilitate the comparison of the two photon count distributions 80 and 81 with respect to their shape, a rescaling of the photon count distribution to be analyzed 81 is first carried out. To this end, a fit function 91 is adapted to the photon count distribution 81 and a fit function 90 is adapted to the reference photon count distribution 80. The fit functions 91, 90 are identical, in the illustrated example $f(x)=f0*\exp(-x/c)$, wherein x indicates the photon counts. In the exponential axis representation of FIG. 3, $f(x)$ corresponds to a straight line with a slope $-1/c$ and ordinate axis intercept $f0$. By means of the adaptation of the functions, values of the fit parameters $f0$ and $c$ are determined for the photon count distribution 80 and for the reference photon count distribution 81. From the determined values of the fit parameters, it is calculated how the photon count distribution 80 should be deformed in order for a new adaptation of the functions to yield approximately the same fit parameter values as in the reference photon count distribution 81. The result of this adjustment is shown in FIG. 4.

FIG. 4 again shows the reference histogram of the reference photon count distribution 80 with the corresponding fit function 90 of FIG. 3. The photon count distribution to be analyzed 81 of FIG. 3 has been adjusted, as described, and a histogram of this adjusted photon count distribution 81B is illustrated in FIG. 4. The fit function 90 is essentially identical to a fit function 91B that could potentially be determined in an adaptation to the photon count distribution 81B (the calculation of the fit function 91B is not necessary and is mentioned here for the purposes of illustration only). It is apparent that the two photon count distributions 80 and 81B essentially correspond with the exception of statistical fluctuations. Consequently, a significant effect due to a saturation of a sensor element during the capture of the photon counts of the photon count distribution 81 did not occur.

Another example is shown in FIG. 5, which once again shows the reference histogram of the reference photon count distribution 80 with a fit function 90 adapted to the same. Also shown is a further histogram of a photon count distribution to be analyzed 82, which is formed by the photon counts of a different sensor element 61 or of a different group 65C. A fit function 92 is adapted to the photon count distribution 82 and the photon count distribution 82 is subsequently adjusted as described above. The result is shown in FIG. 6.

Figure 6:
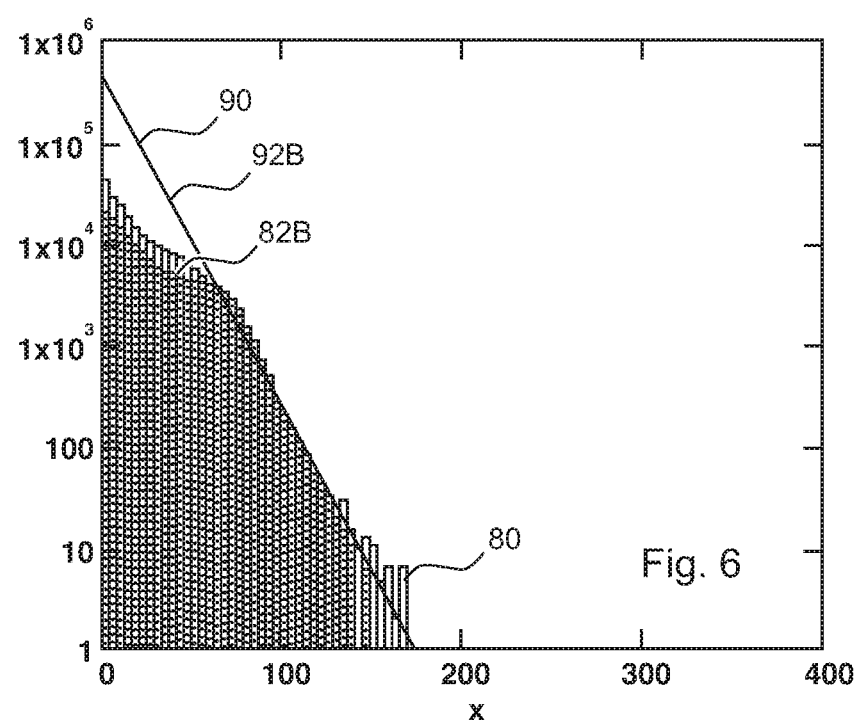

In FIG. 6, deviations between the reference histogram of the reference photon count distribution 80 and the histogram of the adjusted photon count distribution to be analyzed 82B are apparent, in particular at the highest photon counts above a value of approximately 150. This difference is essentially due to a saturation of a sensor element during the capture of the photon counts of the photon count distribution 82. A comparison of the reference photon count distribution 80 with the photon count distribution 82B can thus reveal this saturation.

The comparison can be carried out quantitatively, for example, by calculating a correlation coefficient R, which can be defined as:

$$R=\operatorname{covar}(Hn,Hr,)/(\operatorname{stdev}(Hn)*\operatorname{stdev}(Hr)),$$

where Hn denotes the photon count distribution to be analyzed 82B after the rescaling and Hr denotes the reference photon count distribution 80. In cases of perfect correspondence, R=1. It is thus possible to establish a limit $R_G$, which can be, for example, 0.95 or generally speaking a value between 0.92 and 0.97. If $R<R_G$, then the photon count distribution 82 is identified as saturated/overdriven.

Figure 7:
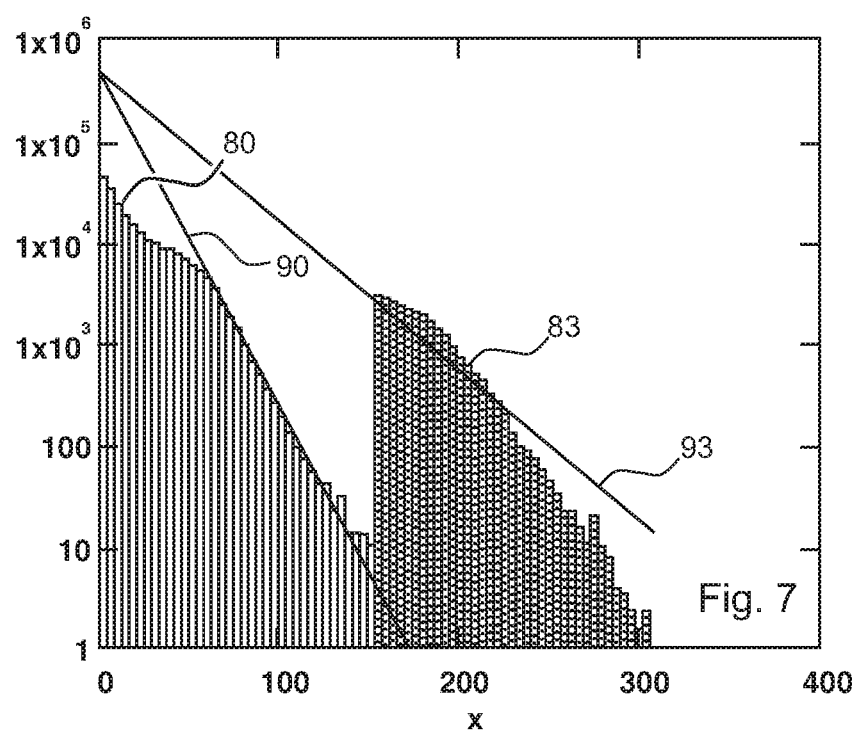
Figure 8:
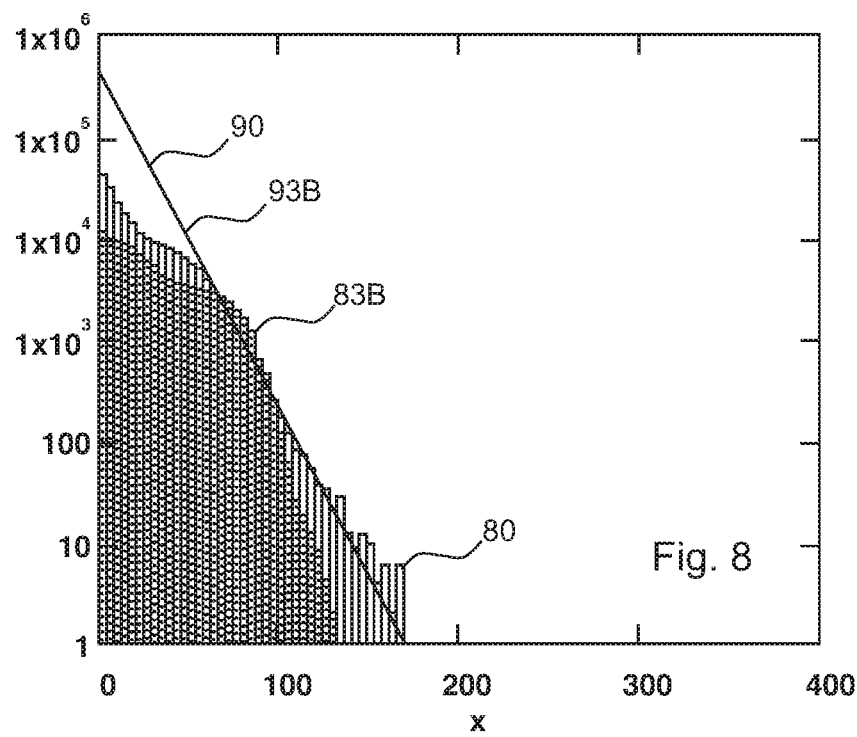

A particularly obvious overdrive of a sensor element is illustrated with reference to FIGS. 7 and 8. FIG. 7 again shows the reference histogram of the reference photon count distribution 80 with an adapted fit function 90 as well as a histogram of a further photon count distribution to be analyzed 83 with an adapted fit function 93. For a better overview, only the part containing larger photon counts of the photon count distribution 83 is shown, wherein the fit function 93 can be adapted to all photon counts, only to the illustrated part of the photon counts or to a part containing photon counts of the photon count distribution 83 that is larger than the illustrated part. The rescaling of the photon count distribution 83 is then carried out. The result is shown in FIG. 8. Although the fit function 90 of the reference photon count distribution 80 corresponds to a fit function 93B of the rescaled photon count distribution 83B, differences between the reference photon count distribution 80 and the rescaled photon count distribution 83B are clearly apparent, in particular at photon counts above approximately 100. The calculation of the correlation coefficient R yields a value in this case that is clearly below the limit $R_G$ so that a saturation of the corresponding sensor element or of the corresponding sensor elements is assumed.

Figure 9:
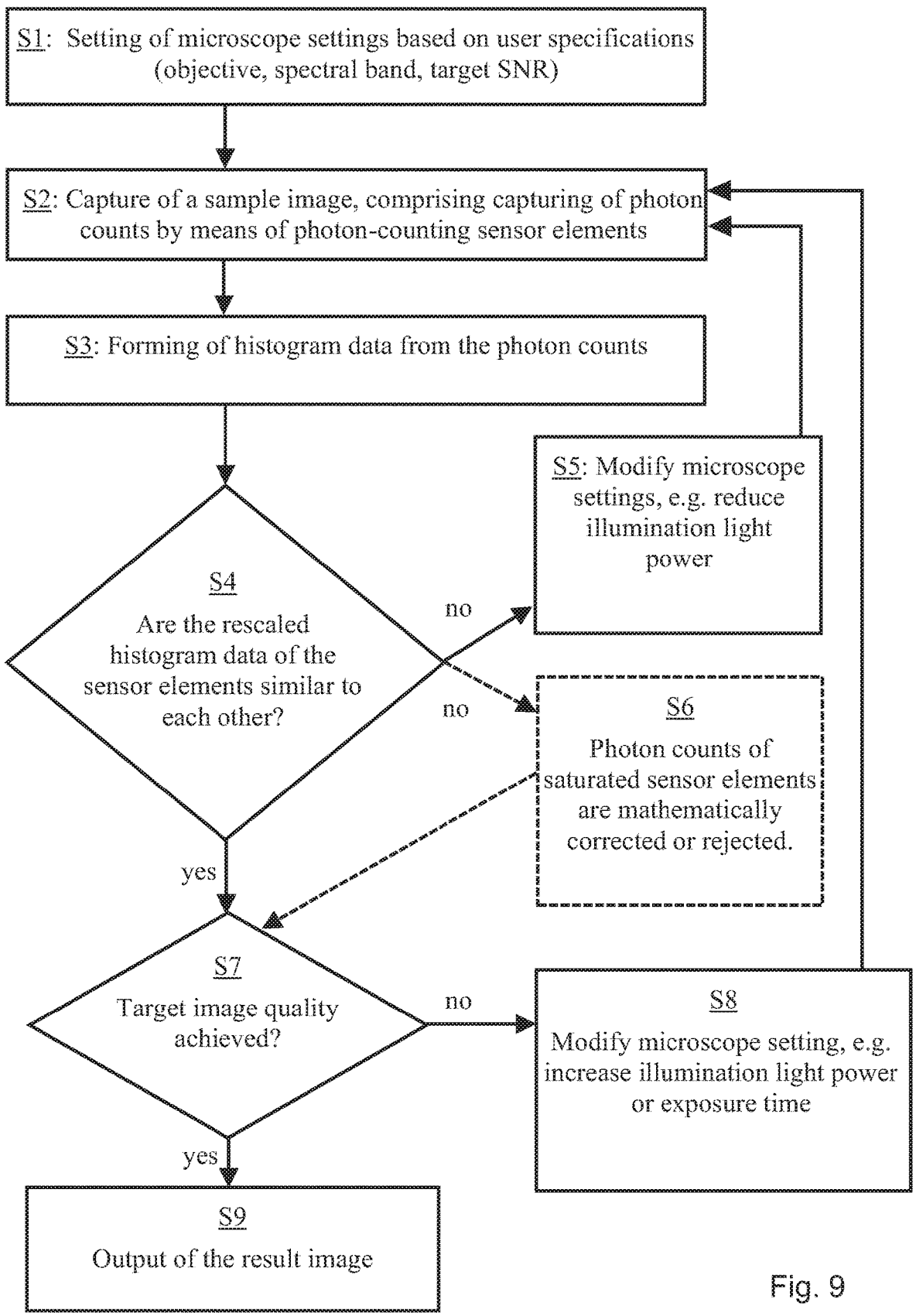
FIG. 9 is a flowchart of an example embodiment of a method according to the present disclosure.

The sequence of this procedure as well as potential actions in the event of a saturation are explained in the following with reference to FIG. 9. FIG. 9 shows a flowchart of an example embodiment of a method according to the invention.

In step S1, a control unit of the light microscope sets microscope settings based on specifications of a user. The user specifications comprise, for example, an objective selection, at least one spectral band for the illumination light and/or detection light, a target image quality, for example a value of a target SNR or a target SBR (SBR: signal-to-background ratio), and/or parameters relating to resolution and to scanning, as well as the indication of a fluorescent dye to be excited. The microscope settings set by the control unit can comprise, for example, an illumination light power and/or, in the case of a sample scan, a pixel dwell time. From the information regarding the objective and dye, the control unit determines the size of the detection light spot on the sensor and can adjust the spot size on the sensor via a system zoom.

The maximum count rate per sensor element is known to the control unit. The control unit can calculate the number of illuminated sensor elements from the calculated spot size on the sensor. The control unit can thereby determine the expected average count rate $f_{Photons}$, with which it is possible to establish the pixel dwell time to be set $\tau_{pixel}$ according to a target SNR, in particular as $\tau_{pixel}=SNR^2/f_{Photons}$.

A sample image is captured in step S2 with these microscope settings. For example, the sample is scanned with the illumination light and the photon-counting sensor elements each capture a plurality of photon counts. A plurality of photon counts belonging to the successively scanned sample points are thus output by each sensor element.

Subsequently, in step S3, the plurality of photon counts of a sensor element or of a group of sensor elements are respectively aggregated in the form of a photon count distribution, which can also be referred to as histogram data. The invention does not require a graphical representation of the photon count distributions in the form of histograms. Rather, the photon count distributions can occur, for example, in the form of tables. The graphical representation in the form of histograms in FIGS. 3 to 8 is optional and essentially for the purposes of illustration.

The forming of the photon count distributions also comprises the forming of at least one reference photon count distribution. The establishment of a reference photon count distribution can occur, for example, as a function of the magnitude of the photon counts of a photon count distribution so that the reference photon count distribution does not contain any excessively high photon counts at which there could be a saturation, but also does not exclusively comprise low photon counts at which the measurement accuracy or SNR would be low in accordance with the low registered detection light power. It is also possible for a first image capture to occur with a relatively low illumination light intensity in order to determine a reference photon count distribution before a further image capture occurs with a higher illumination light intensity, wherein the photon counts used to form the photon count distributions to be analyzed are captured during said further image capture. The reference photon count distribution and the photon count distributions to be analyzed can accordingly be captured either simultaneously or successively.

In step S4, a rescaling and similarity evaluation of the photon count distributions is then carried out, as also described in relation to FIGS. 3 to 8. If the result is that an insufficient similarity is established for at least one of the photon count distributions (or more generally for at least a predetermined number of photon count distributions), the sensor element(s) in question are identified as overdriven. In principle, the method can end with an output of information to this effect to a user.

In the illustrated example, however, in the event of an insufficient similarity of the photon count distribution, step S5 follows, in which a microscope setting is modified in order to avoid an overdrive such as occurred in the previous measurement. The microscope settings are illumination settings and/or detection settings and are modified such that less illumination light hits the sample and/or the number of incident photons per sensor element is decreased. For example, the illumination light power that hits the sample can be reduced by controlling the light source or a filter accordingly. It is also possible to reduce a sensitivity of at least one sensor element that has been identified as overdriven. Alternatively, the size of the detection light spot on the sensor can be magnified with a zoom optic so that the detection light is distributed over more sensor elements. This is again followed by steps S2 to S4, i.e. a new image capture occurs and it is again checked in S4 whether the rescaled photon count distributions are similar to the reference photon count distribution.

If this is the case, step S7 follows. In this step, it is checked whether the photon counts or a result image formed from the photon counts attains a predetermined target image quality. The target image quality can be, for example, a predetermined SNR value. An SNR value can be calculated from the photon count frequency or in principle in a known manner from the result image.

If the target image quality is not attained, the method continues to step S8. A microscope setting is modified by means of which a new captured image should have a higher image quality. For example, the illumination light power or the pixel dwell time is increased. This is again followed by steps S2 to S7.

If it is established in step S7 that the target image quality has been attained, the result image formed from the photon counts captured last is output in step S9. The method is thus completed.

In an optional configuration, the illumination power is increased in step S8 if step S5 has been not carried out with a reduced illumination light power in the process up to that point—a similarity would otherwise probably be negated when step S4 is next carried out. If the illumination light power has been reduced in step S5 in the process up to that point, the pixel dwell time is increased in S8.

In a further optional configuration, step S5 does not necessarily occur when an insufficient similarity is established in step S4. Instead, either step S5 or step S6 is carried out based on a decision criterion. The decision criterion for performing step S5 can be, for example, that a similarity is negated for a certain minimum number of photon count distributions in S4. If, however, a similarity is negated for fewer photon count distributions than the predetermined minimum number, step S6 follows. Another decision criterion can be that, in the event of a negation of similarity in S4, S6 follows as the next step instead of S5 when a certain number of repetitions of the cycle S2-S3-S4-S5 has been reached.

In the optional step S6, the photon count distributions for which a similarity was negated in S4 are discarded, replaced or corrected. For example, they can be replaced by extrapolated photon counts of adjacent sensor elements. This is followed by step S7.

The method steps have been described illustratively for an image capture by means of a scanning of the sample. It is also possible for the method steps to occur without scanning in cases of an image capture with widefield illumination. In the case of a widefield illumination, the scanner 25 in FIG. 1 can be omitted. In FIG. 1, optic elements can be added and, in principle, illustrated optic elements can also be omitted. Moreover, the illustrated de-scanned arrangement is only an example. Illumination light and detection light do not have to be guided via the same objective 30, in which case the beam splitter 22 can be omitted. The shared scanner for illumination light and detection light 12, 15 can also be replaced by a scanner for illumination light 12 and a separate scanner for detection light.

A pinhole can be added for confocal measurements. This is not imperative, however, as it is also possible for the sensor elements to act as a digital pinhole or, optionally, for optical fibres arranged in front of sensor elements to act as a pinhole.

Overdriven sensor elements can be efficiently identified in the described manner. Appropriate measures can be executed in order to automatically carry out a new image capture in which an overdrive is avoided and a sufficiently high image quality is achieved at the same time.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

10 Light source
12 Illumination light
12A, 12B Light paths corresponding to a current setting of the scanner 25
15 Detection light
16 Detection light spot on the sensor 60
22 Beam splitter
23, 24, 27, 28, 29 Optic elements
25 Scanner
30 Objective
35 Sample
60 Sensor, comprising photon-counting sensor elements 61
61 Photon-counting sensor elements
65A-65D Groups of aggregated sensor elements 61
70 Control unit
80 Reference photon count distribution
81-83 Photon count distributions to be analyzed
81B-83B Rescaled photon count distributions to be analyzed
90, 91-93, 91B-93B Fit functions adapted to photon count distributions
100 Light microscope
S1-S9 Method steps
x Photon count of a photon-counting sensor element

What is claimed is:

1. A method of capturing images with a light microscope, comprising:
  guiding illumination light to a sample;
  guiding detection light from the sample to a plurality of photon-counting sensor elements, wherein a plurality of photon counts are successively captured with each photon-counting sensor element;
  forming a plurality of photon count distributions to be analyzed as well as at least one reference photon count distribution from the photon counts, wherein each photon count distribution indicates how often each of several photon count values occurs;
  calculating a similarity between each photon count distribution to be analyzed and the reference photon count distribution; and
  identifying sensor elements as overdriven as a function of the calculated similarity of the corresponding photon count distribution or photon count distributions to be analyzed.

2. The method according to claim 1,
further comprising:
calculating a rescaling between each photon count distribution to be analyzed and the reference photon count distribution;
wherein said calculating of the similarity between each photon count distribution to be analyzed and the reference photon count distribution takes into account the respective rescaling.

3. The method according to claim 2,
wherein
the calculating of the rescaling between each photon count distribution to be analyzed and the reference photon count distribution occurs by stretching or compressing said photon count distribution to be analyzed or the reference photon count distribution.

4. The method according to claim 2,
wherein
the rescaling comprises at least the following:
adjusting a fit function to the reference photon count distribution and to each photon count distribution to be analyzed to determine fit parameters,
stretching or compressing each photon count distribution to be analyzed or the reference photon count distribution as a function of the determined fit parameters.

5. The method according to claim 2,
wherein
the calculating of the similarity comprises at least the following: calculating a correlation coefficient between one of the photon count distributions to be analyzed and the reference photon count distribution after the rescaling between them,
and wherein in cases where the calculated correlation coefficient falls below a predetermined minimum value, the corresponding photon count distribution to be analyzed is identified as overdriven.

6. The method according to claim 1,
further comprising:
forming histograms from the photon count distributions to be analyzed and/or forming a reference histogram from the reference photon count distribution.

7. The method according to claim 1,
further comprising:
selecting at least one photon count distribution as a reference photon count distribution or for forming said reference photon count distribution, wherein the selecting occurs as a function of the magnitude of the photon counts of the corresponding photon count distribution.

8. The method according to claim 7,
wherein
the selecting of at least one photon count distribution as a reference photon count distribution or for forming said reference photon count distribution has as a prerequisite that a highest photon count of this photon count distribution or a mean value formed from the highest photon counts of this photon count distribution is lower than a predetermined upper limit, wherein the upper limit is between 1% and 30% of a maximum count rate of the sensor element belonging to this photon count distribution multiplied by an exposure time.

9. The method according to claim 7,
wherein
the selecting of at least one photon count distribution as a reference photon count distribution or for forming said reference photon count distribution has as a prerequisite that a signal magnitude measure determined from the photon counts of this photon count distribution exceeds a predetermined minimum value.

10. The method according to claim 1,
wherein
a selection of at least one photon count distribution for use as the reference photon count distribution occurs as a function of a position of the corresponding sensor element or of the corresponding sensor elements.

11. The method according to claim 1,
wherein
the sample is scanned with the illumination light,
a distance between adjacent sensor elements is smaller than 1 airy, and
the photon counts successively captured by one of the sensor elements during the scanning of the sample are used to form one of the photon count distributions.

12. The method according to claim 1,
wherein
a widefield illumination is provided by guiding the illumination light onto the sample, and
an imaging of a sample plane onto the sensor elements occurs such that a resolution resulting from the arrangement of the sensor elements is at least as high as defined by the Nyquist criterion.

13. The method according to claim 1,
wherein
a widefield illumination is provided by guiding the illumination light onto the sample;
and wherein a time series measurement is conducted in which photon counts for one or more photon count distributions and the reference photon count distribution are captured successively with the sensor elements.

14. The method according to claim 1,
wherein
a result image is calculated from the captured photon counts of the sensor elements,
and wherein photon counts of sensor elements that have been identified as overdriven are either not included in the calculation of the result image or are first mathematically corrected before they are used for calculation of the result image.

15. The method according to claim 1,
wherein
in cases of an identification of sensor elements as overdriven:
A) an image capture is repeated, wherein a microscope setting is modified such that an incident detection light power per sensor element is reduced, and
B) a control unit calculates by how much an exposure time is to be extended during the repeated image capture based on at least the modified microscope setting, and,
in cases where sensor elements are also identified as overdriven during the repeated image capture, processes A) and B) are repeated.

16. The method according to claim 1,
wherein
in cases where no sensor elements or at most a predetermined maximum number of sensor elements have been identified as overdriven, a check is conducted to determine whether an image quality calculated from the photon counts achieves a predetermined target image quality, and,
in cases where the predetermined target image quality is not achieved, a new image capture occurs with modified microscope settings, wherein the modified microscope settings cause a higher detection light intensity per sensor element or a longer exposure time.

17. The method according to claim 16,
wherein
the new image capture occurs first with an increased illumination light intensity, and,
in cases where sensor elements are identified as overdriven during this new image capture, a further new image capture occurs in which the exposure time is extended in lieu of the increased illumination light intensity.

18. A light microscope comprising:
a light source for emitting illumination light to a sample;
a plurality of photon-counting sensor elements for capturing detection light from the sample, wherein each photon-counting sensor element is configured to successively capture a plurality of photon counts;
a control unit, which is configured to:
form a plurality of photon count distributions to be analyzed as well as at least one reference photon count distribution from the photon counts;
calculate a similarity between each photon count distribution to be analyzed and the reference photon count distribution;
identify sensor elements as overdriven as a function of the calculated similarity of the corresponding photon count distribution or photon count distributions to be analysed; and
calculate a result image from the captured photon counts of the sensor elements, wherein photon counts of sensor elements that have been identified as overdriven are either not included in the calculation of the result image or are first mathematically corrected before they are used for calculation of the result image.

19. The light microscope according to claim 18,
wherein the control unit comprises a field-programmable gate array (FPGA) or some other programmable module, which is configured to execute the method according to claim 1.

20. A method of capturing images with a light microscope, comprising:
guiding illumination light to a sample;
guiding detection light from the sample to a plurality of photon-counting sensor elements, wherein a plurality of photon counts are successively captured with each photon-counting sensor element;
forming a plurality of photon count distributions to be analyzed as well as at least one reference photon count distribution from the photon counts;
calculating a similarity between each photon count distribution to be analyzed and the reference photon count distribution;
identifying sensor elements as overdriven as a function of the calculated similarity of the corresponding photon count distribution or photon count distributions to be analyzed; and scanning the illumination light over the sample in the form of a plurality of illumination points, wherein the illumination points successively scan the same areas of the sample;

wherein the identification of an overdrive occurs during the scanning of the sample, and, in cases where an overdrive is identified with respect to a first of the illumination points, a microscope setting is modified for a remainder of the illumination points such that an incident detection light power per associated sensor element is reduced.

* * * * *